(12) United States Patent
Jin et al.

(10) Patent No.: US 9,747,224 B2
(45) Date of Patent: Aug. 29, 2017

(54) METHOD AND APPARATUS FOR MANAGING REGISTER PORT

(71) Applicant: SAMSUNG ELECTRONICS CO., LTD., Suwon-si (KR)

(72) Inventors: Tai-Song Jin, Seoul (KR); Jae-Un Park, Seoul (KR); Do-hyung Kim, Hwaseong-si (KR); Seung-won Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 174 days.

(21) Appl. No.: 14/644,951

(22) Filed: Mar. 11, 2015

(65) Prior Publication Data

US 2015/0261695 A1     Sep. 17, 2015

(30) Foreign Application Priority Data

Mar. 11, 2014   (KR) .......................... 10-2014-0028591

(51) Int. Cl.

| | |
|---|---|
| *G06F 3/00* | (2006.01) |
| *G06F 13/12* | (2006.01) |
| *G06F 5/00* | (2006.01) |
| *G06F 13/28* | (2006.01) |
| *G06F 13/00* | (2006.01) |
| *G06F 13/36* | (2006.01) |
| *G06F 13/10* | (2006.01) |
| *G06F 1/32* | (2006.01) |

(52) U.S. Cl.
CPC .......... *G06F 13/102* (2013.01); *G06F 1/3203* (2013.01); *G06F 1/3287* (2013.01)

(58) Field of Classification Search
CPC ............... G06F 1/266; G06F 8/37; G06F 8/38
USPC ................... 710/65, 6, 52, 56, 107
See application file for complete search history.

(56) References Cited

U.S. PATENT DOCUMENTS

| | | | |
|---|---|---|---|
| 6,564,331 B1 | 5/2003 | Joshi | |
| 2008/0263318 A1* | 10/2008 | May | ....................... G06F 9/3851 712/23 |
| 2009/0013329 A1* | 1/2009 | May | ..................... G06F 9/30072 719/313 |
| 2009/0013331 A1* | 1/2009 | May | ................... G06F 15/17337 719/315 |
| 2009/0085919 A1* | 4/2009 | Chen | ....................... G06T 15/005 345/520 |
| 2009/0313460 A1* | 12/2009 | Huang | ................. G06F 11/3636 712/227 |
| 2013/0024666 A1* | 1/2013 | Lee | ........................ G06F 9/3012 712/214 |

* cited by examiner

*Primary Examiner* — Ernest Unelus
*Assistant Examiner* — Getente A Yimer
(74) *Attorney, Agent, or Firm* — Sughrue Mion, PLLC (57) ABSTRACT

Provided is a method of managing a register port, the method including performing scheduling on register ports that are used during a plurality of cycles to enable performing of a calculation; encoding data of the register ports according to results of the scheduling, the encoding of the data including, with respect to data of one of the register ports that does not have a schedule during one of the plurality of cycles, equally encoding the data of the one register port during the one cycle with data of an adjacent cycle of the one register port, the adjacent cycle being adjacent to the one cycle; and transmitting results of the encoding to a device that includes the register ports.

15 Claims, 6 Drawing Sheets

Run time bits change

|  | port0 | port1 | port2 | port3 |
|---|---|---|---|---|
| Time 0 | 1 | 2 | 3 | |
| Time 1 | 1 | 2 | 3 | |
| Time 2 | 4 | 2 | 3 | |
| Time 3 | 4 | 2 | 3 | |
| Time 4 | 5 | 6 | 3 | |
| Time 5 | 5 | 6 | 3 | |

Disable unused port

METHOD AND APPARATUS FOR MANAGING REGISTER PORT

CROSS-REFERENCE TO RELATED APPLICATION

This application claims the benefit of Korean Patent Application No. 10-2014-0028591, filed on Mar. 11, 2014, in the Korean Intellectual Property Office, the disclosure of which is incorporated herein in its entirety by reference.

BACKGROUND

1. Field

One or more exemplary embodiments relate to a method and apparatus for managing a register port.

2. Description of the Related Art

A register is connected to a function unit and stores data for calculations. The register includes a read port and a write port. While the calculations are performed, data may be read from or written to the register by using the ports of the register.

Function units use data stored in the register. The function units consume electric power so as to access the register, and may read information stored in the register or may write information to the register.

SUMMARY

One or more exemplary embodiments provide a method and apparatus for reducing power consumption of a register file.

One or more exemplary embodiments also provide a non-transitory computer-readable recording medium having recorded thereon a program for executing the method, by using a computer.

Additional aspects will be set forth in part in the description which follows and, in part, will be apparent from the description, or may be learned by practice of the presented exemplary embodiments.

According to an aspect of an exemplary embodiment, there is provided a method of managing a register port, the method including performing scheduling on register ports that are used during a plurality of cycles to enable performing of a calculation; encoding data of the register ports according to results of the scheduling, wherein the encoding of the data includes, with respect to data of one of the register ports that does not have a schedule during one of the plurality of cycles, equally encoding the data of the one register port during the one cycle with data of an adjacent cycle of the one register port, the adjacent cycle being adjacent to the one cycle; and transmitting results of the encoding to a device that includes the register ports.

According to another aspect of an exemplary embodiment, there is provided a compiler including a scheduler configured to perform scheduling on register ports that are used during a plurality of cycles to enable performing of a calculation; an encoder configured to encode data of the register ports according to results of the scheduling, and further configured to, with respect to data of one of the register ports that does not have a schedule during one of the plurality of cycles, equally encode the data of the one register port during the one cycle with data of an adjacent cycle of the one register port, the adjacent cycle being adjacent to the one cycle; and a transmitter configured to transmit the encoded data to a device that includes the register ports.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Hereinafter, exemplary embodiments will be described in detail with reference to the attached drawings.

Figure 1:
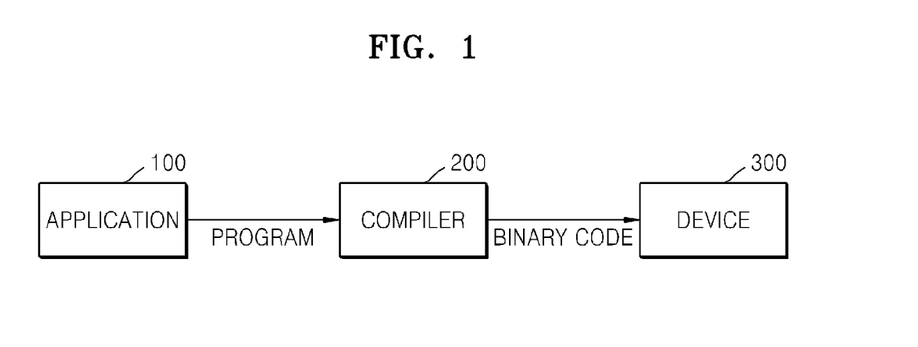
FIG. 1 illustrates a compiler and peripheral devices.

FIG. 1 illustrates a compiler 200 and peripheral devices. Referring to FIG. 1, an application 100, the compiler 200, and a device 300 transmit and receive data to and from each other.

The application 100 transmits a program to the compiler 200. The application 100 generates the program and transmits the generated program to the compiler 200.

The application 100 generates the program by using a high-level language such as C, C++, Java, or the like. The application 100 generates the program by using a program language that is usable by a user.

The compiler 200 converts the program into a binary code. The compiler 200 converts the program generated by the application 100 into the binary code that is readable by the device 300. The compiler 200 transmits the binary code to the device 300.

The device 300 performs a calculation according to the binary code. The binary code includes a function for the calculation, information related to managing a register file, use information about a register port, or the like.

The device 300 is an electronic device capable of performing the calculation according to the binary code. The device 300 may be a personal computer (PC), a smart phone, a tablet PC, or the like.

Figure 2:
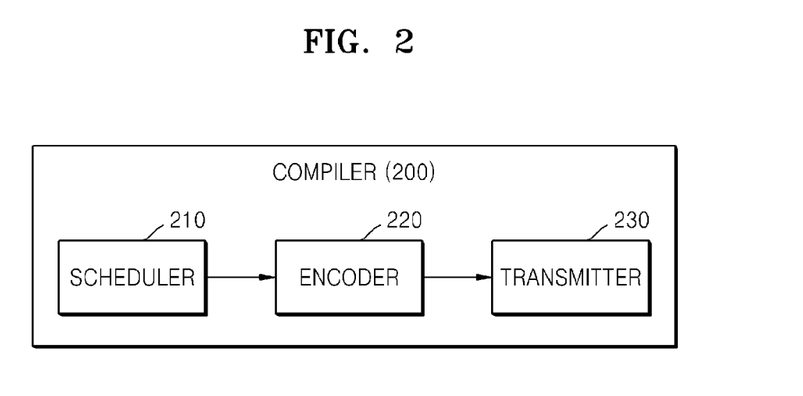
FIG. 2 illustrates a compiler according to an exemplary embodiment.

FIG. 2 illustrates a compiler 200 according to an exemplary embodiment. Referring to FIG. 2, the compiler 200 includes a scheduler 210, an encoder 220, and a transmitter 230.

The scheduler 210 performs scheduling on register ports that are used in every cycle of a plurality of cycles while a calculation is performed. In other words, the scheduler 210 determines schedules of the register ports during the calculation. A schedule of each of the register ports denotes whether each register port is used in each cycle. According to an exemplary embodiment, the calculation may be a loop calculation that is performed in a coarse grained array (CGA). The scheduler 210 performs scheduling on the register ports for each loop calculation.

In addition, by using the register ports, the scheduler 210 performs scheduling with regard to which register is to be used. In other words, by using the register ports during the calculation, the scheduler 210 determines which register that stores data is to be used by a function unit.

The encoder 220 encodes data of the register ports according to results of the scheduling, and data of the register port that does not have a schedule in some cycles is encoded equally with data of an adjacent cycle, by the encoder 220. The encoder 220 generates a binary code based on the results of the scheduling. According to an exemplary embodiment, in a case of a cycle in which a schedule of each register port is determined, the encoder 220 performs encoding according to the determined schedule, and in a case of a cycle in which the schedule of each register port is not determined, the encoder 220 performs encoding according to a schedule of another cycle. For example, when a schedule of a first cycle of a first register port is determined and a schedule of a second cycle is not determined (e.g., when the second cycle does not have a schedule), the encoder 220 encodes the schedule of the second cycle of the first register port according to the schedule of the first cycle. The data of the register ports indicates which register a function unit will access.

The transmitter 230 transmits the encoding results to a device that includes the register ports. The device that includes the register ports may be a PC, a smart phone, a tablet PC, or the like.

Figure 3:
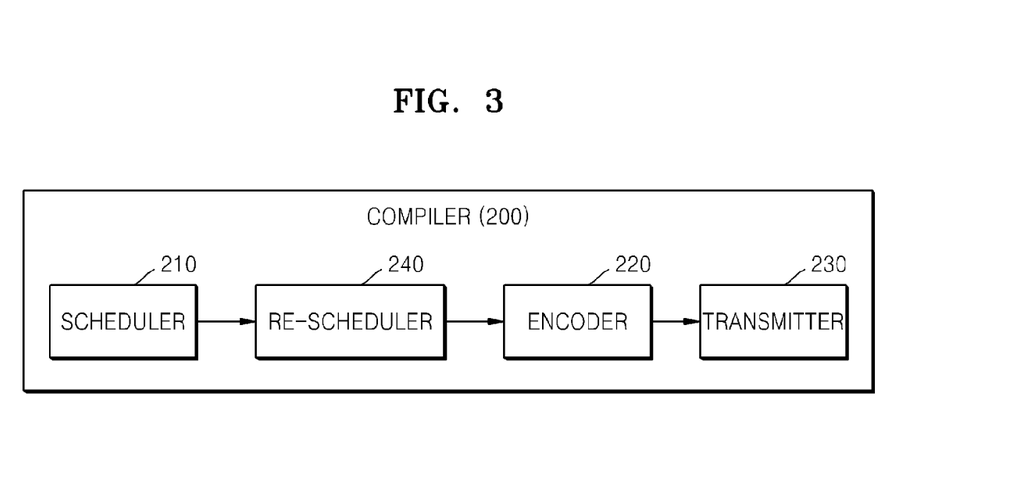
FIG. 3 illustrates a compiler according to another exemplary embodiment.

FIG. 3 illustrates a compiler 200 according to another exemplary embodiment. Referring to FIG. 3, the compiler 200 further includes a re-scheduler 240.

The re-scheduler 240 re-schedules a schedule of the first register port as a schedule of the second register port, based on results of the scheduling. In other words, the re-scheduler 240 adjusts schedules of the register ports by changing a schedule of a register port to a schedule of another register port.

The re-scheduler 240 re-schedules a schedule of the first register port as schedules of one or more other register ports, based on the results of the scheduling. The re-scheduler 240 determines a register port that is least frequently used during a calculation, and re-schedules a schedule of the determined register port as the schedules of the one or more other register ports. In other words, the re-scheduler 240 determines the register port that has the least number of schedules during the calculation. The re-scheduler 240 changes the schedule of the determined register port to schedules of other register ports. For example, when first through third register ports are used for a specific calculation and the third register port is least frequently used, the re-scheduler 240 changes the schedule of the third register port to the schedule of the first or second register port. According to an exemplary embodiment, the re-scheduler 240 changes the schedule of the third register port, in consideration of the schedule of the first or second register port. According to an exemplary embodiment, the calculation may be a loop calculation that is performed in a CGA. The scheduler 240 performs scheduling on register ports for each loop operation.

Figure 4:
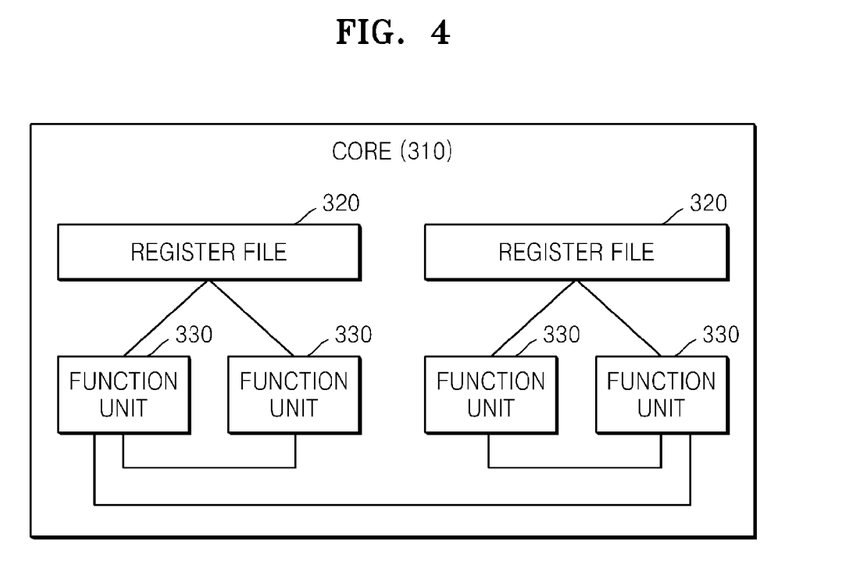
FIG. 4 illustrates a core that includes a register file.

FIG. 4 illustrates a core 310 that includes register files. Referring to FIG. 4, the core 310 includes register files 320 and function units 330.

A processor includes a plurality of the cores 310. Further, according to an exemplary embodiment, the device 300 of FIG. 1 includes a plurality of the processors.

The compiler 200 controls a process by which the function units 330 use data of the register file 320. In other words, the compiler 200 manages a schedule by which the function units 330 access the register file 320. The register file 320 includes a plurality of registers, but the number of ports for accessing the registers is limited. Accordingly, the function units 330 operate according to schedules designated by the compiler 200, in order to access the registers.

The register file 320 is a type of memory. The register file 320 includes a plurality of registers that store data. The function units 330 perform calculations by using the data stored in the register file 320.

Figure 5:
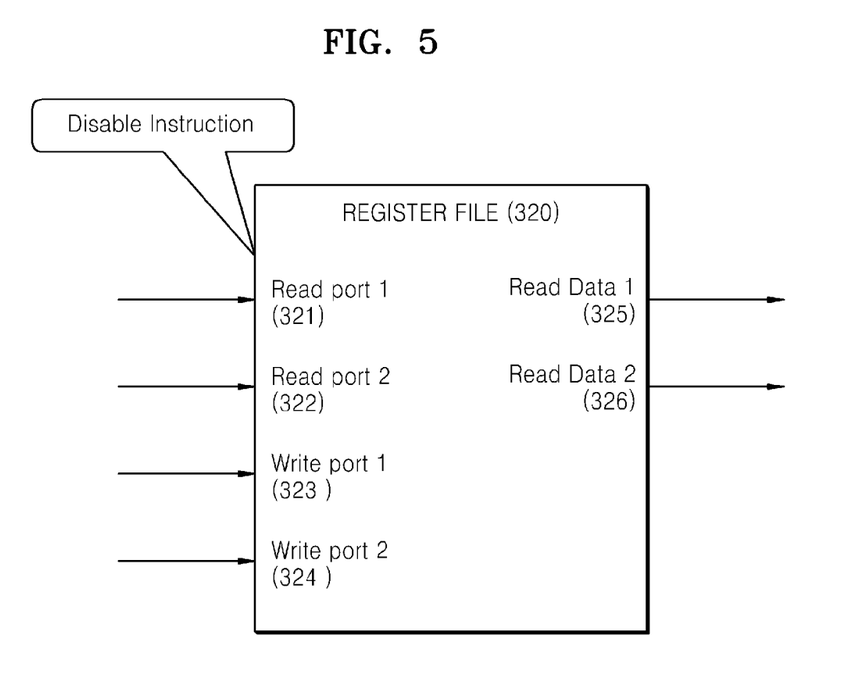
FIG. 5 illustrates a register file.

FIG. 5 illustrates a register file 320. Referring to FIG. 5, the register file 320 includes a read port 1 321, a read port 2 322, a write port 1 323, and a write port 2 324.

The compiler 200 controls ports of the register file 320. The compiler 200 transmits an instruction to the device 300 so as to deactivate some or all of the ports of the register file 320. The device 300 receives the instruction and thus deactivates some or all of the ports. In other words, the device 300 cuts off electric power supplied to the port. The compiler 200 may cease use of some ports while a specific loop calculation is performed. For example, when the compiler 200 transmits an instruction to the device 300 so as to cut off electric power supplied to the read port 1 321, the device 300 cuts off the electric power supplied to the read port 1 321.

Figure 6:
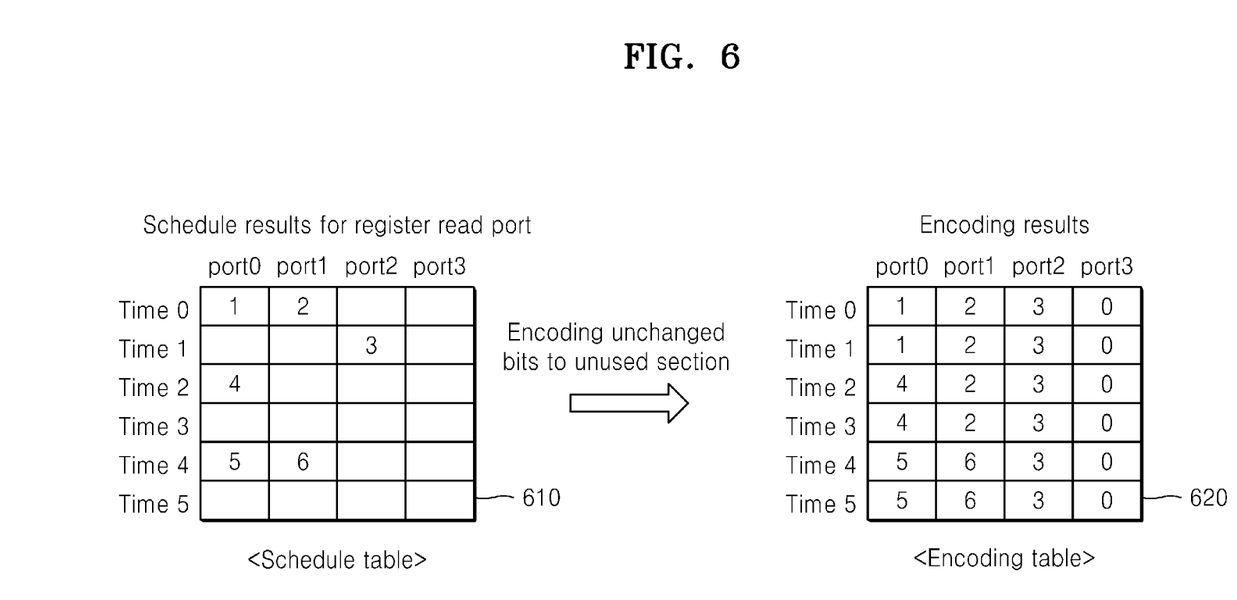
FIG. 6 illustrates a method by which a compiler performs encoding, according to an exemplary embodiment.

FIG. 6 illustrates a method by which a compiler 200 performs encoding according to an exemplary embodiment. Referring to FIG. 6, data of a register port that does not have a schedule in some cycles is encoded equally with data of an adjacent cycle, by the compiler 200.

A schedule table 610 shows scheduling results obtained by the compiler 200 by performing scheduling on register ports used in every cycle. Referring to the schedule table 610, calculations proceed from Time 0 to Time 5, and each of Time 0 to Time 5 represents a respective cycle. Also, ports used during the calculations include a port 0, a port 1, and a port 2, and as shown in the schedule table 610, the ports 0, 1, and 2 are used six times in total. Port 3 is not used during the calculations.

The schedule table 610 shows the scheduling results obtained by the compiler 200 by performing scheduling on register ports used in every cycle. Referring to the schedule table 610, in a case of Time 0 (i.e., in a case of a first cycle), the port 0 and the port 1 are used. In a case of Time 0, the function unit 330 accesses data of a first register via the port 0, and accesses data of a second register via the port 1. In a case of Time 1, the function unit 330 accesses data of a third register via the port 2. In a case of Time 2, the function unit 330 accesses data of a fourth register via the port 0. In a case of Time 4, the function unit 330 accesses data of a fifth register via the port 0, and accesses data of a sixth register via the port 1.

An encoding table 620 shows encoding results obtained by the compiler 200 by encoding data of register ports used in every cycle. Referring to the encoding table 620, the compiler 200 performs encoding so as to significantly decrease a change in a register that the function unit 330 accesses. For example, when the compiler 200 encodes data of the port 0, since the port 0 does not have a schedule in Time 1, the compiler 200 encodes data of the port 0 in the same way as the case of Time 0. In other words, in the case of Time 1, the compiler 200 performs encoding so that the function unit 330 may access data of the first register via the port 0. In addition, in a case of the port 2, the compiler 200 performs encoding so that the function unit 330 may access data of the third register via the port 2 in all time slots of Time 0 to Time 5. According to the encoding results by the compiler 200, the function unit 330 accesses the same data, and thus, it is possible to decrease electric power consumption for changing data which is required when the function unit 330 accesses other data.

Figure 7:
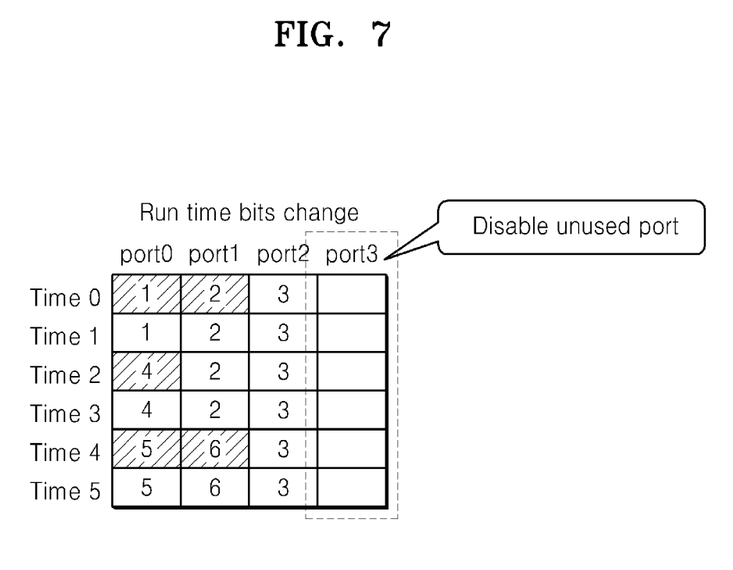
FIG. 7 illustrates a method by which a compiler controls unused ports during calculations, according to an exemplary embodiment.

FIG. 7 illustrates a method by which the compiler 200 controls unused ports while a calculation is performed. Referring to FIG. 7, the compiler 200 transmits an instruction so as to cut off a power supply to the unused ports while the calculation is performed. The device 300 receives the instruction, and thus cuts off the power supply to the unused ports.

Referring to FIG. 7, the compiler 200 cuts off the power supply to a port 3. According to results of scheduling or re-scheduling, when the port 3 is not used during the calculation, the compiler 200 transmits an indication to the device 300 that the port 3 is not used during the calculation. The device 300 receives the indication, and thus does not supply electric power to the port 3 during the calculation.

Figure 8:
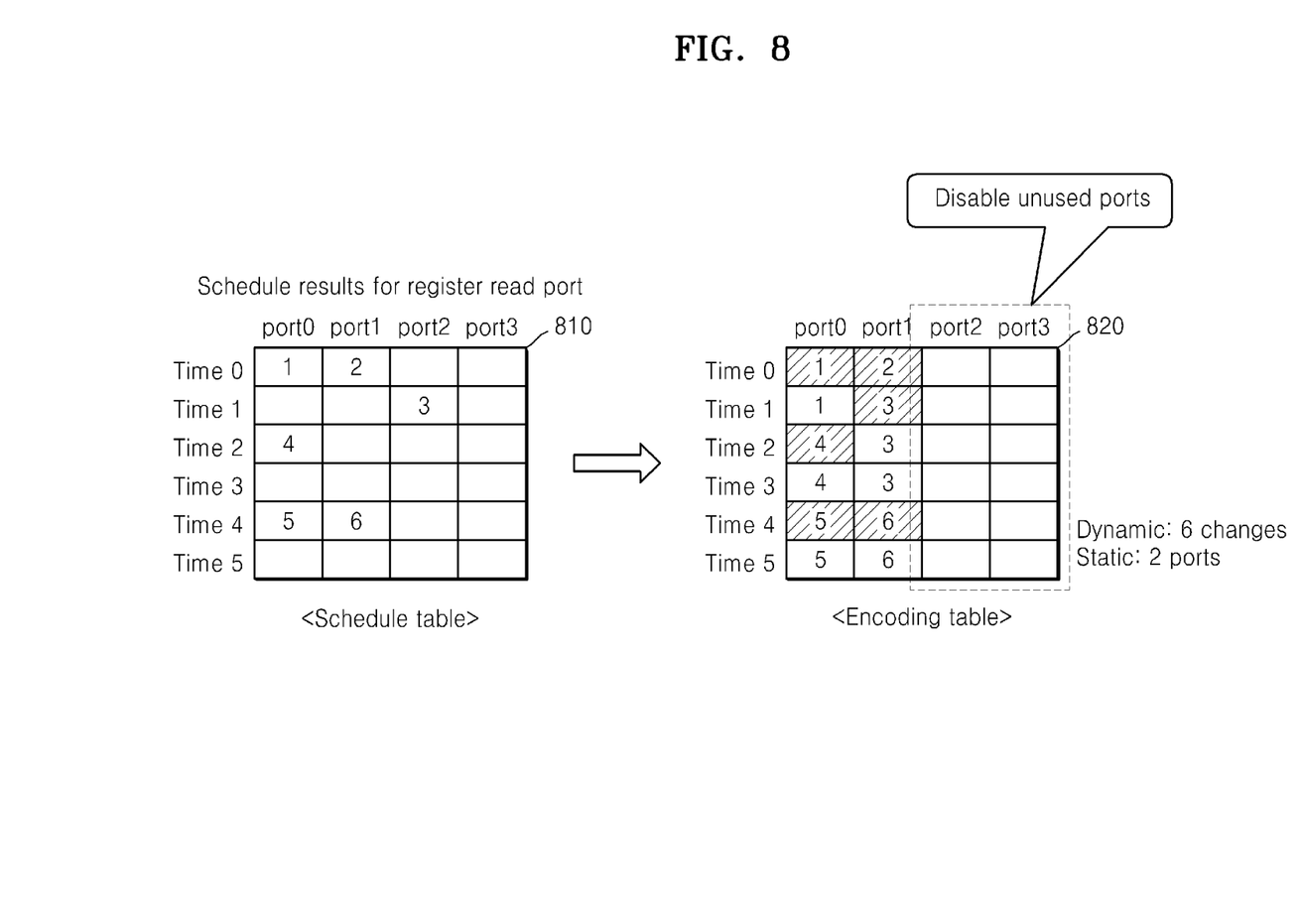
FIG. 8 illustrates a method by which a compiler performs encoding, according to an exemplary embodiment.

FIG. 8 illustrates a method by which the compiler 200 performs encoding, according to another exemplary embodiment. Referring to FIG. 8, the compiler 200 performs encoding in order to significantly decrease power consumption.

The compiler 200 selects one or more ports by referring to a schedule table 810. The compiler 200 selects a port that is least frequently used. Also, the compiler 200 selects a port whose schedule may be changed to a schedule of another port.

The compiler 200 changes the schedule of the selected port to a schedule of another port. In other words, the compiler 200 re-schedules the schedules of ports. Referring to FIG. 8, the compiler 200 selects a port 2, and changes a schedule of the port 2 in Time 2 to a schedule of a port 1 in Time 2.

The compiler 200 performs encoding so that a register that is accessed by the function unit 330 via a port is not changed. In order to significantly decrease a change in a schedule of a port, the compiler 200 equally encodes data of a register port, which does not have a schedule in some cycles, with data of an adjacent cycle. For example, since a port 0 is not used in Time 1, the compiler 200 equally encodes data of the port 0 in Time 1 with data of the port 0 in Time 0.

The compiler 200 determines an unused port during a calculation. Referring to an encoding table 820, as results of re-scheduling, a port 2 and a port 3 are not used during the calculation. Accordingly, the compiler 200 determines the port 2 and the port 3 as unused ports.

The compiler 200 transmits information about the unused ports to the device 300. In detail, the compiler 200 transmits an instruction to the device 300 so as to cut off a power supply to the unused ports. The device 300 cuts off the power supply to the unused ports that are not used during the calculation, and thus reduces power consumption.

As the results of encoding in FIG. 8, the register that is accessed by the function unit 330 is changed six times in total. In the encoding table 820, marked regions indicate times when the register that is accessed by the function unit 330 is changed.

Figure 9:
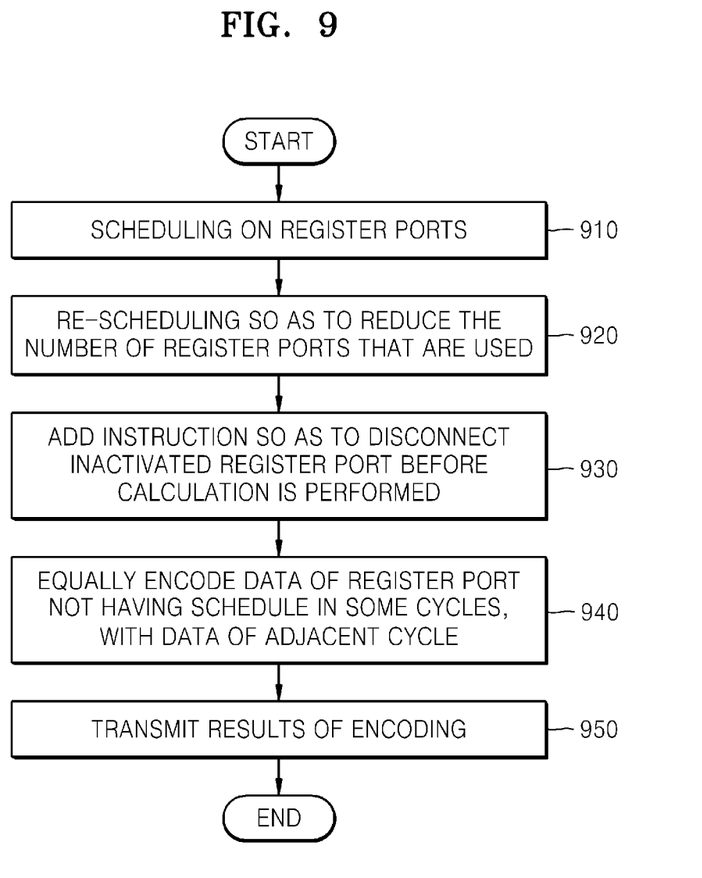
FIG. 9 is a flowchart of describing a method by which a compiler manages a register port, according to an exemplary embodiment.

FIG. 9 is a flowchart of a method by which the compiler 200 manages a register port, according to an exemplary embodiment.

In operation 910, the compiler 200 performs scheduling on register ports. The compiler 200 determines schedules of the register ports that are used in a loop calculation. The compiler 200 determines in which cycle, through which resister ports, and to which register, the function unit 330 will access.

In operation 920, the compiler 200 performs re-scheduling in order to reduce the number of register ports that are used. The compiler 200 changes a schedule of a register port that is least frequently used to a schedule of another register port.

In operation 930, the compiler 200 transmits an instruction to the device 300 so as to disconnect an inactivated register port before a calculation is performed. Before the calculation is performed, the compiler 200 transmits an indication or a message informing which port is the inactivated register port, to the device 300. The inactivated register port is not used during the calculation.

In operation 940, the compiler 200 equally encodes data of a register port, which does not have a schedule in some cycles, with data of an adjacent cycle. The compiler 200 performs encoding so as to significantly decrease a change in a register that the function unit 330 accesses, so that it is possible to reduce electric power consumption due to the change in the registers accessed by the functional unit 330.

In operation 950, the compiler 200 transmits encoding results to the device 300. The device 300 performs the calculation according to the encoding results.

The computer readable code can be recorded or transferred onto a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bit stream according to one or more exemplary embodiments. The media may also be a distributed network, so that the computer readable code is stored or transferred and executed in a distributed fashion.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the exemplary embodiments as defined by the following claims.

What is claimed is:

1. A method of managing a register port of a register file by a processor, the method comprising:
   scheduling on register ports that are used during a plurality of cycles;
   encoding data of the register ports based on the scheduling, wherein the data indicates a register accessed by a function unit of the processor, and wherein with respect to an unscheduled register port that does not have a schedule during a cycle, encoding data scheduled in a previous cycle of the unscheduled register port; and
   transmitting results of the encoding to the processor that comprises the register ports,
   wherein the method further comprises determining a register port that is least frequently used while a calculation is performed among the register ports, and re-scheduling a schedule of the determined register port as schedules of one or more other register ports among the register ports.

2. The method of claim 1, further comprising re-scheduling a schedule of a first register port among the register ports as a schedule of a second register port among the register ports, based on results of the scheduling.

3. The method of claim 1, further comprising re-scheduling a schedule of a first register port among the register ports as schedules of one or more other register ports among the register ports, based on results of the scheduling.

4. The method of claim 1, further comprising transmitting an instruction so as to cut off a power supply to the one register port, which is not used while a calculation is performed.

5. The method of claim 1, wherein the plurality of cycles is for performing a calculation and the calculation comprises a loop calculation configured to be performed in a coarse grained array (CGA).

6. A non-transitory computer-readable recording medium having recorded thereon a program which, when executed, causes a computer to execute a method of:
scheduling on register ports that are used during a plurality of cycles;
encoding data of the register ports based on the scheduling, wherein the data indicates a register accessed by a function unit of the processor, and wherein with respect to an unscheduled register port that does not have a schedule during a cycle, encoding data scheduled in a previous cycle of the unscheduled register port; and
transmitting results of the encoding to the processor that comprises the register ports,
wherein the method further comprises determining a register port that is least frequently used while a calculation is performed among the register ports, and re-scheduling a schedule of the determined register port as schedules of one or more other register ports among the register ports.

7. A compiler comprising:
a scheduler configured to schedule on register ports that are used during a plurality of cycles;
an encoder configured to encode data of the register ports indicating a register accessed by a function unit of a processor based on the scheduling, and wherein with respect to an unscheduled register port that does not have a schedule during a cycle, encode the data scheduled in a previous cycle of the unscheduled register port;
a transmitter configured to transmit the encoded data to the processor that comprises the register ports; and
a re-scheduler configured to determine a register port that is least frequently used while a calculation is performed among the register ports, and re-schedule a schedule of the determined register port as schedules of one or more other register ports among the register ports.

8. The compiler of claim 7, wherein the re-scheduler is further configured to re-schedule a schedule of a first register port among the register ports as a schedule of a second register port among the register ports, based on results of the scheduling.

9. The compiler of claim 7, wherein the re-scheduler is further configured to re-schedule a schedule of a first register port among the register ports as schedules of one or more other register ports among the register ports, based on results of the scheduling.

10. The compiler of claim 7, wherein the transmitter is configured to transmit an instruction so as to cut off a power supply to one of the register ports, which is not used while a calculation is performed.

11. The compiler of claim 7, wherein the plurality of cycles is for performing a calculation and the calculation comprises a loop calculation configured to be performed in a coarse grained array (CGA).

12. An electronic device configured to exchange data with a compiler, the electronic device comprising:
a processor;
a plurality of register files disposed in the processor and respectively configured to store data to be used for performing a calculation during a plurality of cycles; and
a plurality of register ports disposed within one of the plurality of register files,
wherein the processor is configured to receive scheduling data from the compiler and reconfigure the received data based on scheduling such that data of an unscheduled register port that does not have a schedule during a cycle is equally encoded with data scheduled in a previous cycle of the unscheduled register port and wherein the data indicates a register accessed by a function unit of the processor, and
wherein the processor is further configured to receive an instruction which cuts off a power supply to one of the register ports, which is not used while the calculation is performed.

13. The electronic device of claim 12, wherein the plurality of register ports comprises a plurality of read ports.

14. The electronic device of claim 12, implemented as a smart phone.

15. The electronic device of claim 12, wherein the one register file further comprises a plurality of registers configured to store the data of the one register file, wherein a number of the registers in the one register file is greater than a number of the register ports in the one register file.

* * * * *